US012791335B2

(12) United States Patent
Raju

(10) Patent No.: US 12,791,335 B2
(45) Date of Patent: Nov. 10, 2026

(54) SAFETY ROUTING IDENTIFICATION SYSTEM

(71) Applicant: Uber Technologies, Inc., San Francisco, CA (US)

(72) Inventor: Kanchanapalli Muralidhar Raju, Telangana (IN)

(73) Assignee: Uber Technologies, Inc., San Francisco, CA (US)

( * ) Notice: Subject to any disclaimer, the term of this patent is extended or adjusted under 35 U.S.C. 154(b) by 97 days.

(21) Appl. No.: 18/905,869

(22) Filed: Oct. 3, 2024

(65) Prior Publication Data

US 2026/0049823 A1 Feb. 19, 2026

(30) Foreign Application Priority Data

Aug. 19, 2024 (IN) ............................ 202411062461

(51) Int. Cl.
*G01C 21/34* (2006.01)
*G01C 21/36* (2006.01)
(Continued)

(52) U.S. Cl.
CPC ..... *G01C 21/3461* (2013.01); *G01C 21/3438* (2013.01); *G01C 21/3602* (2013.01);
(Continued)

(58) Field of Classification Search
CPC ............ G01C 21/3461; G01C 21/3438; G01C 21/3602; G01C 21/3647; G06V 10/751;
(Continued)

(56) References Cited

U.S. PATENT DOCUMENTS 8,805,707 B2 8/2014 Schumann, Jr. et al.
9,927,252 B1 3/2018 Chokshi et al.
(Continued)

FOREIGN PATENT DOCUMENTS

CN 103954278 7/2014
CN 104596740 A * 5/2015
(Continued)

OTHER PUBLICATIONS

Machine Translation of Foreign Reference: CN104596740A—Zhang et al. (Year: 2013).*
(Continued)

*Primary Examiner* — Scott A Browne
*Assistant Examiner* — Rami Nabih Bedewi
(74) *Attorney, Agent, or Firm* — Schwegman Lundberg & Woessner, P.A.

(57) ABSTRACT

Systems and methods are provided to receive a request for service indicating a start location and a destination location for the service, determine that a time of day for the request for service triggers a safety analysis, and analyze the start location and destination location to identify a pickup location to start the service and a drop-off location to end the service based on lighting metrics associated with the pickup location and the drop-off location. The systems and methods further generate a plurality of candidate routes for the service from the pickup location to the drop-off location, generate a safety score for each candidate route of the plurality of candidate routes by identifying a lighting metrics based on pixel values in imagery for each segment of each candidate route and select a route for the service based on a least the safety score of each candidate route.

20 Claims, 8 Drawing Sheets

(51) Int. Cl.
*G06V 10/75* (2022.01)
*G06V 20/13* (2022.01)
*G06V 20/56* (2022.01)

(52) U.S. Cl.
CPC ....... *G01C 21/3647* (2013.01); *G06V 10/751* (2022.01); *G06V 20/13* (2022.01); *G06V 20/56* (2022.01)

(58) Field of Classification Search
CPC ........ G06V 20/56; G06V 20/13; G06V 10/50; H04N 23/843
See application file for complete search history.

(56) References Cited

U.S. PATENT DOCUMENTS

| | | | |
|---|---|---|---|
| 10,082,556 | B1 | 9/2018 | Hopcraft et al. |
| 10,152,053 | B1 | 12/2018 | Smith et al. |
| 10,521,321 | B2 | 12/2019 | Jong et al. |
| 11,313,689 | B2 | 4/2022 | Gupta et al. |
| 11,320,280 | B2 | 5/2022 | Gupta et al. |
| 11,686,588 | B2 | 6/2023 | Shirani-Mehr et al. |
| 11,852,495 | B1 * | 12/2023 | Sanchez ................. G06Q 40/08 |
| 2008/0293430 | A1 | 11/2008 | Blom et al. |
| 2011/0213628 | A1 | 9/2011 | Peak et al. |
| 2012/0304156 | A1 | 11/2012 | Feiveson et al. |
| 2014/0358437 | A1 | 12/2014 | Fletcher |
| 2015/0294080 | A1 | 10/2015 | Garnavi et al. |
| 2017/0059347 | A1 | 3/2017 | Flier et al. |
| 2018/0047269 | A1 | 2/2018 | Thomas et al. |
| 2018/0328748 | A1 | 11/2018 | Chachra et al. |
| 2018/0341812 | A1 | 11/2018 | Floor et al. |
| 2019/0248487 | A1 * | 8/2019 | Holtz ..................... B64U 70/90 |
| 2020/0164891 | A1 | 5/2020 | Bender et al. |
| 2020/0318982 | A1 | 10/2020 | Shirani-Mehr et al. |
| 2020/0318983 | A1 * | 10/2020 | Shirani-Mehr ........ G06V 20/56 |
| 2021/0140777 | A1 * | 5/2021 | Balva ................. G01C 21/3484 |
| 2021/0172753 | A1 * | 6/2021 | Johnson, Jr. ......... G01C 21/343 |
| 2022/0214183 | A1 | 7/2022 | Shirani-mehr et al. |
| 2022/0351616 | A1 * | 11/2022 | Kubin ................ G01C 21/3461 |
| 2023/0291880 | A1 * | 9/2023 | Kobayashi ............. H04N 23/86 |

FOREIGN PATENT DOCUMENTS

| | | |
|---|---|---|
| KR | 101483943 | 1/2015 |
| WO | 2016163613 | 10/2016 |
| WO | 2019047240 | 3/2019 |
| WO | 2020206253 | 10/2020 |

OTHER PUBLICATIONS

U.S. Appl. No. 16/374,272 now U.S. Pat. No. 11,320,280, filed Apr. 3, 2019, Location Safety Determination System.
U.S. Appl. No. 16/374,295 now U.S. Pat. No. 11,313,689, filed Apr. 3, 2019, Route Safety Determination System.
U.S. Appl. No. 17/655,934 now U.S. Pat. No. 11,686,588, filed Mar. 22, 2022, Route Safety Determination System.
"International Application Serial No. PCT US2020 026577, International Search Report mailed Jun. 2, 2020", 5 pgs.
"International Application Serial No. PCT US2020 026577, Written Opinion mailed Jun. 2, 2020", 7 pgs.
"Chapter 17 Detecting Objects in Images", Detecting Extracts, 12 pgs.
"U.S. Appl. No. 16/374,272, Non Final Office Action mailed Feb. 1, 2021", 20 pgs.
"Machine Translation of KR101483943B1", (2015).
"U.S. Appl. No. 16/374,295, Non Final Office Action mailed Mar. 1, 2021", 13 pgs.
"U.S. Appl. No. 16/374,272, Response filed Apr. 30, 2021 to Non Final Office Action mailed Feb. 1, 2021", 9 pgs.
"U.S. Appl. No. 16/374,295, Response filed May 17, 2021 to Non Final Office Action mailed Mar. 1, 2021", 10 pgs.
"U.S. Appl. No. 16/374,272, Final Office Action mailed Jun. 8, 2021", 21 pgs.
"U.S. Appl. No. 16/374,295, Final Office Action mailed Jun. 15, 2021", 17 pgs.
"U.S. Appl. No. 16/374,272, Examiner Interview Summary mailed Jul. 29, 2021", 2 pgs.
"U.S. Appl. No. 16/374,272, Response filed Aug. 3, 2021 to Final Office Action mailed Jun. 8, 2021", 9 pgs.
"U.S. Appl. No. 16/374,295, Examiner Interview Summary mailed Aug. 9, 2021", 2 pgs.
"U.S. Appl. No. 16/374,272, Response filed Aug. 12, 2021 to Final Office Action mailed Jun. 15, 2021", 10 pgs.
"U.S. Appl. No. 16/374,272, Non Final Office Action mailed Aug. 19, 2021", 22 pgs.
"Machine Translation of WO2019047240A1", (2019).
"U.S. Appl. No. 16/374,295, Non Final Office Action mailed Sep. 24, 2021", 19 pgs.
"U.S. Appl. No. 16/374,272, Response filed Nov. 1, 2021 to Non Final Office Action mailed Aug. 19, 2021", 10 pgs.
"U.S. Appl. No. 16/374,295, Response filed Nov. 23, 2021 to Non Final Office Action mailed Sep. 24, 2021", 11 pgs.
"U.S. Appl. No. 16/374,295, Notice of Allowance mailed Jan. 24, 2022", 13 pgs.
"U.S. Appl. No. 16/374,272, Notice of Allowance mailed Feb. 18, 2022", 14 pgs.
"U.S. Appl. No. 16/374,272, Corrected Notice of Allowability mailed Mar. 9, 2022", 11 pgs.
"European Application Serial No. 20723617.5, Response to Communication pursuant to Rules 161 and 162 filed May 20, 2022", 19 pgs.
"U.S. Appl. No. 17/655,934, Non Final Office Action mailed Nov. 14, 2022", 18 pgs.
"U.S. Appl. No. 17/655,934, Response filed Jan. 26, 2023 to Non Final Office Action mailed Nov. 14, 2022", 8 pgs.
"U.S. Appl. No. 17/655,934, Notice of Allowance mailed Feb. 14, 2023", 10 pgs.
Beyer, F R, "Street lighting for preventing road traffic injuries (Review)", Cochrane Library, (2010), 59 pgs.
Chianis, Alexia, "How Safe Is Your Neighborhood?", https: www. safewise.com blog confirm-safety-neighboorhood-online-tools , (Nov. 28, 2018), 9 pgs.
Goel, Preeti, "Optimal pick up point selection for effective ride sharing", IEEE Transactions on Big Data 2, (2017), 14 pgs.
Salomon, Brian, "Accelerating Line-of-Sight queries for Terrain Processing using Region Based Visibility", Computer Science, (2006), 6 pgs.
Weissman, A, "2.5D Mapping Using GNSS Signal Analysis", Positioning Navigation and Communication (WPNC), 2013 10th Workshop On, IEEE, [retrieved on Jun. 14, 2013], (Mar. 20, 2013), 6 pgs.

* cited by examiner

400

SAFETY ROUTING IDENTIFICATION SYSTEM

CLAIM FOR PRIORITY

This application claims the benefit of priority of Indian Application No. 202411062461, filed Aug. 19, 2024, which is hereby incorporated by reference in its entirety.

BACKGROUND

A user may request transport for the user or a delivery via an application on a computing device from a pickup location to a destination or drop-off location.

There are often locations that are unsafe due to theft, assault, potholes, unconditioned roads, treefalls, speed driving and other issues. Improvements in safety for the user, a driver of a vehicle for transport, and a travel route are desired.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods are described to determine safe pickup and drop-off locations and safe routes to a pickup and a drop-off location. For example, a user can request a transport service for the user or for delivery of an item, but there is no way for the user or driver of a vehicle to know whether a location is safe for pickup or drop-off. This is especially true when a user or driver is in an unfamiliar area. Likewise, there may be numerous routes to a particular pickup or drop-off location but no way for a user or driver to determine which is the safest route to the pickup or drop-off location.

Examples are described that address the technical problems of determining a safe location or route by leveraging satellite or other imagery and using geospatial vector datasets. In this way, systems and methods described can specify a safe pickup or drop-off location to address safety concern and prioritize routes from a pickup location to a drop-off location that have ample nighttime lighting for enhanced security and safety.

In one example, systems and methods are provided to receive a request for service indicating a start location and a destination location for the service and determine that a time of day for the request for service triggers a safety analysis. The systems and methods further analyze the start location and destination location to identify a pickup location to start the service and a drop-off location to end the service based on lighting metrics associated with the pickup location and the drop-off location. The systems and methods further generate a plurality of candidate routes for the service from the pickup location to the drop-off location, generate a safety score for each candidate route of the plurality of candidate routes by identifying a lighting metrics based on pixel values in imagery for each segment of each candidate route and select a route for the service based on a least the safety score of each candidate route. The selected route can be provided to a computing device for vehicle navigation.

Figure 1:
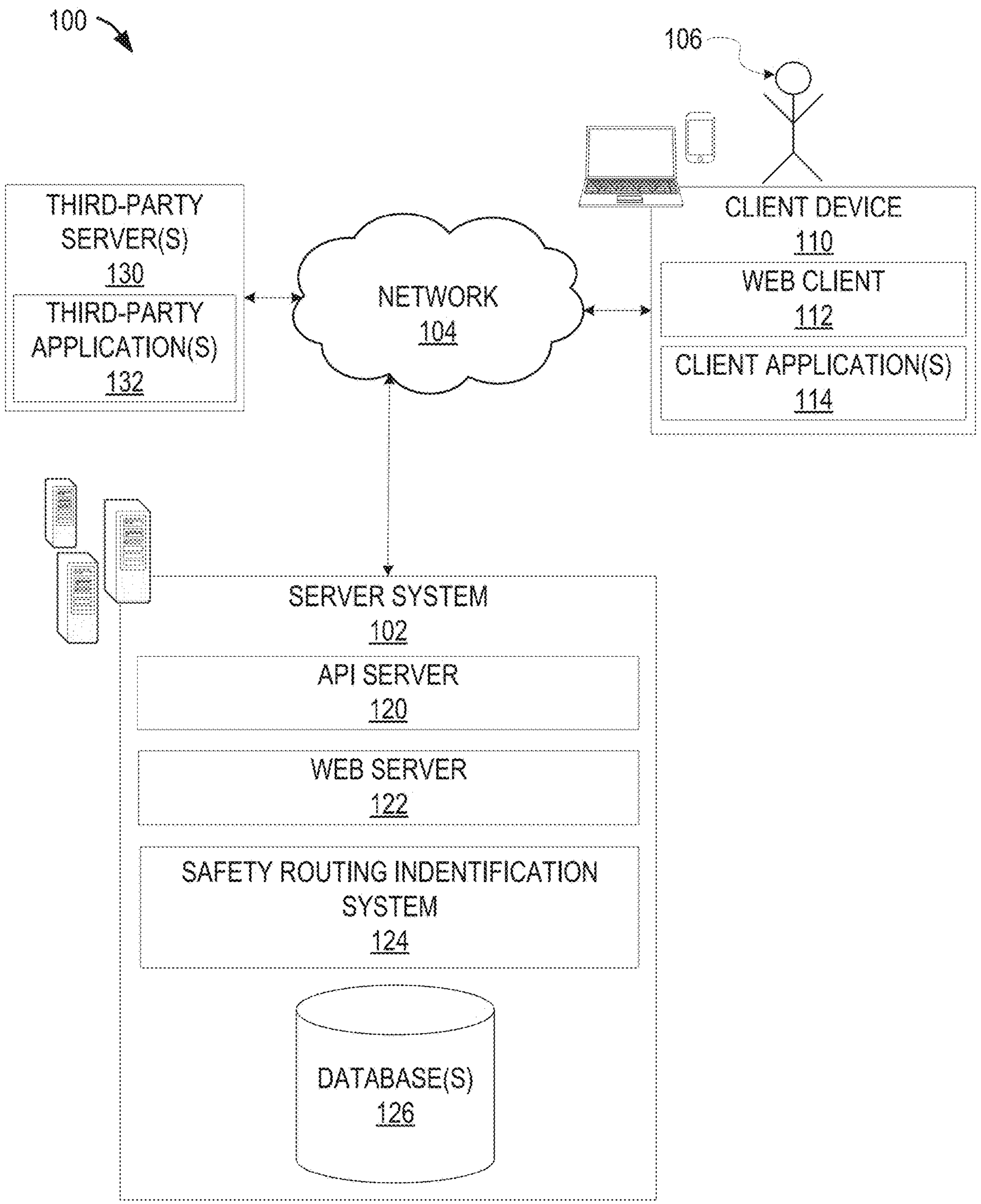
FIG. 1 is a block diagram illustrating a networked system, according to some examples.

FIG. 1 is a block diagram illustrating a networked system 100, according to some example embodiments. The system 100 includes one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, wearable device or any other communication device that a user may utilize to access the networked system 100. In some embodiments, the client device 110 comprises a display module (not shown) to display information (e.g., in the form of user interfaces). In further embodiments, the client device 110 can comprise one or more of touchscreens, accelerometers, gyroscopes, cameras, microphones, GPS devices, inertial measurement units (IMUs), and so forth. The client device 110 can be a device of a user that is used to request map information, provide map information, request navigation information, receive and display results of map and/or navigation information, request data about a place or entity in a particular location, receive and display data about a place or entity in a particular location, receive and display data about a pickup or drop-off location, receive and display data related to navigation to a pickup or drop-off location, receive and display points of interest for a location (e.g., neighborhood, city), and so forth.

One or more users 106 can be a person, a machine, or other means of interacting with the client device 110. In example embodiments, the user 106 is not part of the system 100 but interacts with the system 100 via the client device 110 or other means. For instance, the user 106 provides input (e.g., touchscreen input or alphanumeric input) to the client device 110 and the input can be communicated to other entities in the system 100 (e.g., third-party servers 130, server system 102) via a network 104. In this instance, the other entities in the system 100, in response to receiving the input from the user 106, communicate information to the client device 110 via the network 104 to be presented to the user 106. In this way, the user 106 interacts with the various entities in the system 100 using the client device 110. In some example embodiments, the user 106 is a rider in a ride-sharing service, a driver in a ride-sharing or delivery service, a person desiring information about a rider pick-up and/or drop-off location, or the like.

The system 100 further includes the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WIFI network, a WiMax network, another type of network, or a combination of two or more such networks.

The client device 110 accesses the various data and applications provided by other entities in the system 100 via a web client 112 (e.g., a browser, such as the Internet Explorer® browser developed by Microsoft® Corporation of Redmond, Washington State) or one or more client applications 114. The client device 110 includes the one or more client applications 114 (also referred to as "apps") such as, but not limited to, a web browser, a messaging application, an electronic mail (email) application, an e-commerce site application, a mapping or location application, a ride-sharing application, a delivery application, a navigation application, and the like.

In some embodiments, the one or more client applications 114 are included in the client device 110, and configured to locally provide a user interface and at least some of the functionalities, with the client applications 114 configured to communicate with other components or entities in the system 100 (e.g., third-party servers 130, server system 102), on an as-needed basis, for data and/or processing capabilities not locally available (e.g., to access location information, to request a pickup or drop-off location, to access navigation information, to authenticate the user 106, to verify a method of payment). Conversely, the one or more client applications 114 is not included in the client device 110, and the client device 110 can use its web browser to access the one or more applications hosted on other entities in the system 100 (e.g., third-party servers 130, server system 102).

The server system 102 provides server-side functionality via the network 104 (e.g., the Internet or a wide area network (WAN)) to one or more third-party servers 130 and/or one or more client devices 110. In some examples, the server system 102 includes an application programming interface (API) server 120, a web server 122, and a safety routing identification system 124, that are communicatively coupled with one or more databases 126.

The one or more databases 126 are storage devices that store data related to one or more of source code, navigation data, pick-up and drop-off locations, a nearest node to a destination location, points of interest and related data (e.g., POI location, POI name, instructions, etc.), trip data (e.g., trip count), areas of interest and related lighting metrics, accident and incident scores and safety scores, satellite imagery, imagery from cameras in vehicles, and so forth. The one or more databases 126 may further store information related to the third-party servers 130, third-party applications 132, the client device 110, the client applications 114, the user 106, and so forth. The one or more databases 126 may be cloud-based storage.

The server system 102 is a cloud computing environment, according to some example embodiments. The server system 102, and any servers associated with the server system 102, are associated with a cloud-based application, in one example.

The safety routing identification system 124 provides back-end support for the third-party applications 132 and the client applications 114, which can include cloud-based applications. The safety routing identification system 124 analyzes imagery to generate lighting metrics and safety scores for areas of interest, including pickup and drop-off locations and routes, among other things, as described in further detail below. The safety routing identification system 124 comprises one or more servers and/or other computing devices or systems.

The system 100 further includes one or more third-party servers 130. The one or more third-party servers 130 comprise one or more third-party applications 132. The one or more third-party applications 132, executing on the third-party server(s) 130, interact with the server system 102 via a programmatic interface provided by the API server 120. For example, third-party applications 132 can request and utilize information from the server system 102 via the API server 120 to support one or more features or functions on a website hosted by a third party or an application hosted by the third party. In one example, a third-party application 132 can request and receive POI data, navigation data, pickup and drop-off location data, routing data, and so forth, via the server system 102 and the safety routing identification system 124.

Figure 2:
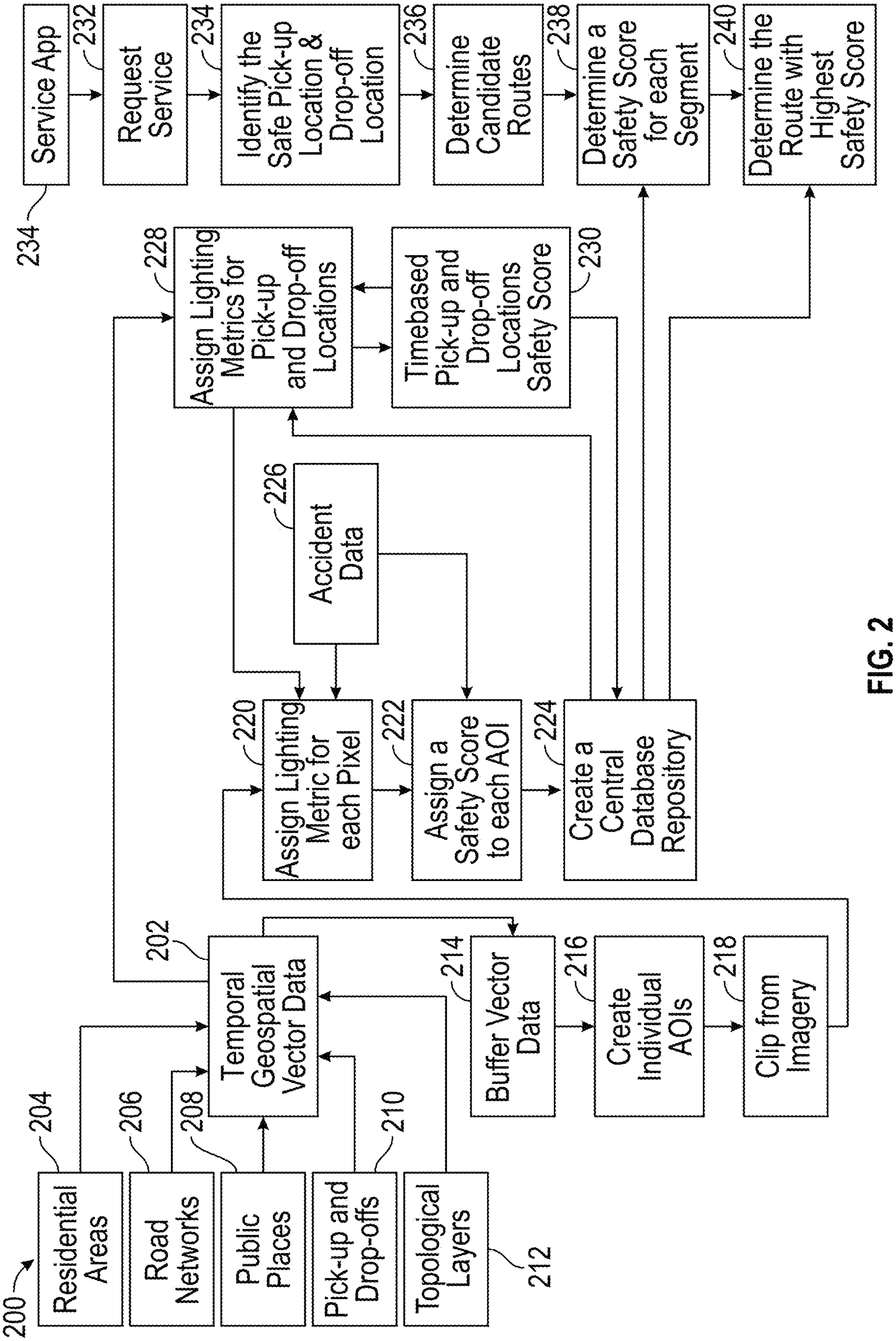
FIG. 2 is a block diagram illustrating a safety routing identification system, according to some examples.

FIG. 2 is a block diagram illustrating aspects of the safety routing identification system 124. The safety routing identification system 124 generates temporal geospatial vector data 202 using various location and mapping data, such as data for residential areas 204, road networks 206, public places 208, pickup and drop-off locations 210, topological layers 212, and the like. The safety routing identification system 124 buffers the vector data 214 to create individual areas of interest (AOIs). For example, the safety routing identification system 124 can buffer the vector data 214 by a predefined number of meters (or other measurement), such as by five or ten meters. The safety routing identification system 124 clips or extracts images from imagery data 218 corresponding to each AOI. For example, the safety routing identification system 124 extracts satellite imagery and/or imagery from a plurality of cameras in vehicles for the location area of each AOI. The safety routing identification system 124 assigns a lighting metric 220 for each pixel in the extracted imagery for each AOI and then assigns a safety score to each AOI 222, as explained in further detail below. The safety score can be further generated using accident data 226. Accident data can be generated or accessed from government data sources on accidents or other incidents, such crimes, from user-reported accident or incident data, or from other sources of accident or incident data.

The safety routing identification system 124 creates a central database repository 224, such as in database(s) 126 or other data stores and stores the lighting metrics for each pixel and safety score for each AOI. An AOI can be a road segment, a pickup or drop-off location, a residential area, a public place, a city, or other geographical area or location.

As mentioned above an AOI can include pickup and drop-off locations. Thus, the safety routing identification system 124 can generate lighting metrics and safety scores for pickup and drop-off locations as explained above for AOIs. In other examples, the safety routing identification system 124 can have a separate process just for pickup and drop-off locations where the safety routing identification system 124 generates and assigns lighting metrics for each of a predefined pickup and drop-off location 228 and generates time-based pickup and drop-off safety scores for the pickup and drop-off locations 230, that indicates how safe a pickup or drop-off location is based on a time of day. The lighting metrics and time-based pickup and drop-off safety scores are also stored in the central database repository 224.

The safety routing identification system 124 can receive a request for service 232 from a service app 234 via a computing device, such as client device 110. The safety routing identification system 124 identifies a safe pickup location and drop-off location 234 for the service based on lighting metrics and safety scores for the area of service in the central database repository 224.

The safety routing identification system 124 determines candidate routes for the service 236 and determines a safety score for each segment of each candidate route 238. The safety routing identification system 124 determines a route with a highest safety score 240 based on the safety scores for each segment of each candidate route.

Figure 3:
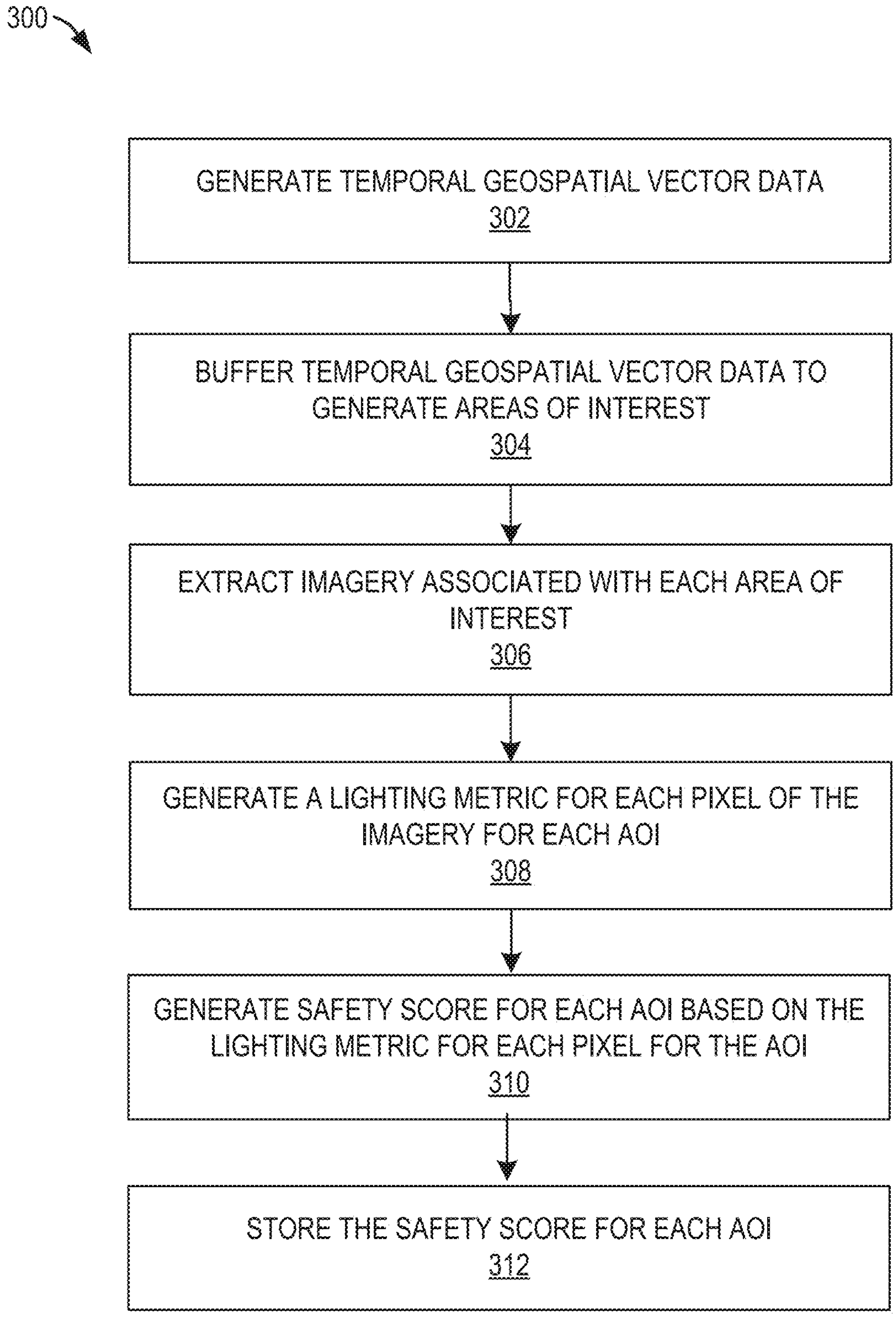
FIG. 3 is a flowchart illustrating aspects of a method, according to some examples.

FIG. 3 is a flowchart illustrating aspects of a method 300 for generating safety scores for areas of interest, according to some examples. For illustrative purposes, the method 300 is described with respect to the networked system 100 of FIG. 1. It is to be understood that the method 300 may be practiced with other system configurations in other examples.

In operation 302, a computing system (e.g., server system 102 or the safety routing identification system 124), generates temporal geospatial vector data based on data for at least one of residential areas, road networks, public places, landmarks, frequently visited places, road intersections, pickup and drop-off locations and topological layers. For example, the computing system accesses one or more data stores that contains data identifying residential areas, road networks, public places, historical pickup and drop-off locations and topographical layers and builds the temporal geospatial vector data using this data.

In operation 304, the computing system buffers the temporal geospatial vector data to generate individual areas of interest. For example, the computing system determines road segments, public places, residential areas, pickup and drop-off locations and buffers each area of interest with a certain amount of space, such as by five or ten meters (or other measurement). The buffered geographical areas each become an individual area of interest. Buffering provides for a bit more area to assess for safety to be sure safety is more accurately determined for a particular area of interest.

Figure 4:
FIG. 4 illustrates an example of acquired satellite imagery post sunset in a city at multiple time stamps, according to some examples.

In operation 306, the computing system extracts imagery associated with each individual area of interest. For example, the computing system accesses satellite imagery and/or images captures by cameras in vehicles and clips or extracts the images corresponding to each individual area of interest. The computing system can use spatiotemporal satellite imageries acquired from satellites that capture visuals after the sun has set in a city or other location. This involves obtaining images at different points in time to observe variations. FIG. 4 shows an example 400 of acquired satellite imagery post sunset in a city at multiple time stamps. Note that this is a black and white example for purposes of this patent application. The actual imagery may include a spectrum of light colors, such as various shades of white and yellow light.

The spatiotemporal satellite imagery is used to understand a geolocation's lighting at different times. In the alternative or in addition to the satellite imagery, the computing system can access images from cameras in vehicles. For example, the imagery is based on camera imagery captured by each of a plurality of cameras in a respective vehicle. These images can be stored in one or more data stores, such as database(s) 126) and can also cover various geographical areas at different times.

The computing system identifies geographical areas associated with each individual area of interest, such as residential areas, roads and public spaces. And then can utilize the acquired satellite imagery and/or images captured by cameras in vehicles to pinpoint and categories locations as areas of interest, such as residential areas, pickup or drop-off locations, public spaces, and other areas of interest. In one example, a machine learning model is used to identify the areas of interest in the imagery using the geospatial vector data as a supervised sample for training.

In another example, the computing system determines which satellite images correspond to an area of interest based on spatial resolution and temporal resolution. Spatial resolution refers to an area on the ground that each pixel in an image represents. In one example, each pixel can take around 30 centimeters on the ground, thus representing an area on the ground that is 30×30 centimeters. In another example, one pixel can represent two meters on the ground, thus representing an area on the ground that is 2×2 meters. It is to be understood that any spatial resolution can be used in examples described herein.

Temporal resolution refers to the time it takes for a satellite to complete an orbit to a same ground location (e.g., area on the ground). For example, this could be 1-16 days, 6 months, one year or other time period depending on the satellite. The computing system can determine which satellite images correspond to an area of interest based on the location of the pixels (spatial resolution) within a time period (temporal resolution).

In operation 308, the computing system generates a lighting metric for each pixel for each individual area of interest based on analyzing the extracted imagery to determine lighting in each individual area of interest. For instance, the computing system evaluates the imagery to determine the RGB (red green blue) value for each pixel in the image for the area of interest. Some example methods to determine RGB values include visual interpretation, geospatial packages, python image library, adobe photoshop, Matlab, and the like. The RGB value indicates the amount of light present in the real-world scene represented by the pixel. The higher the RGB value, the lighter the color, which indicates more light in a geographical location corresponding to the pixel. Conversely, the lower the RGB value, the darker the color, which indicates less light in a geographical location corresponding to the pixel. For instance, lower RGB value correspond to black, such as RGB=(0,0,0) representing pitch black, RGB=(127,127,127) indicates a grey shade, and RGB=(255,255,255) signifies white.

Figure 5:
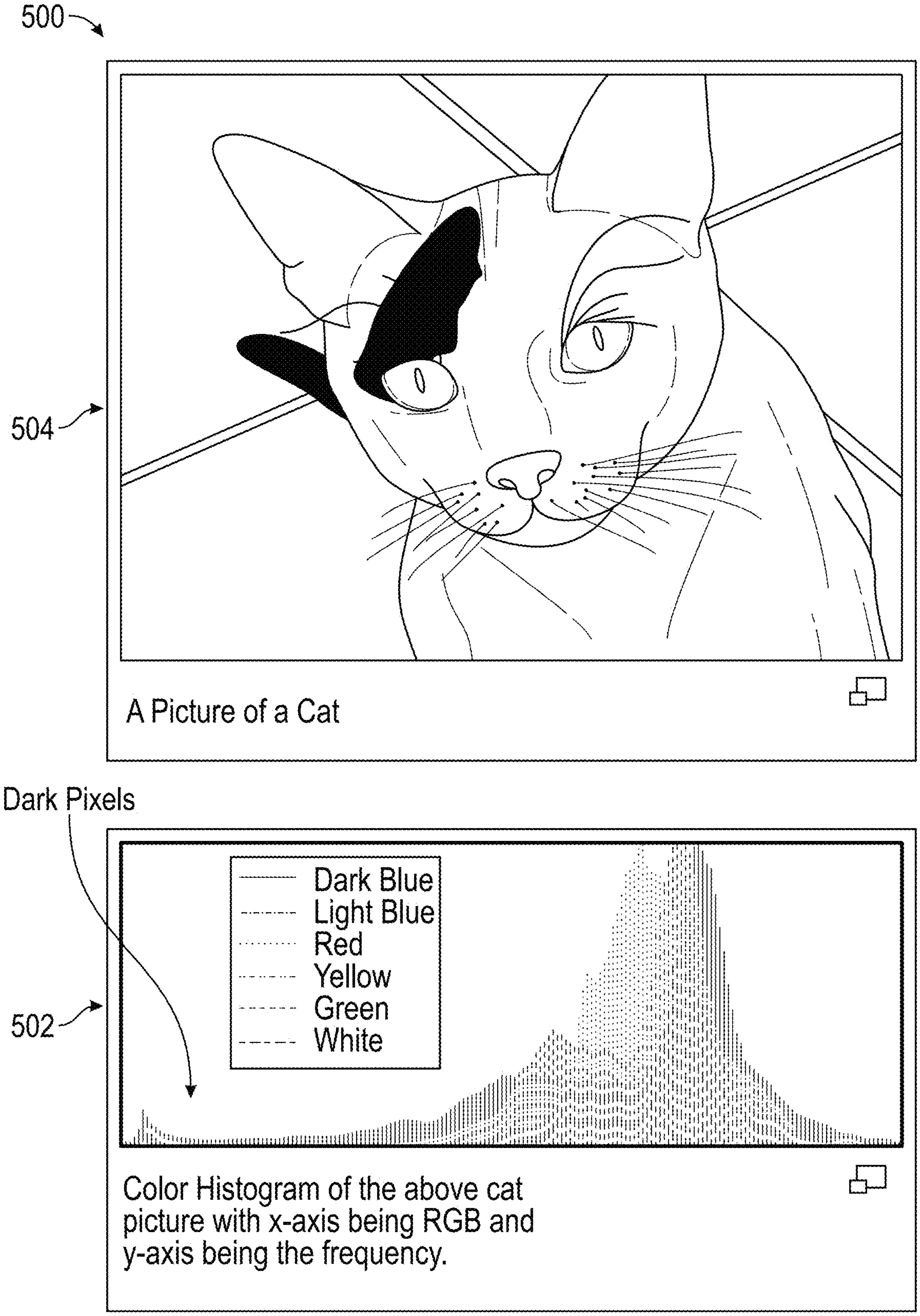
FIG. 5 illustrates an example histogram for an image, according to some examples.

In one example, the computing system optionally generates a graphical representation based on the satellite imagery (or camera in the vehicle) data, such as by generating a histogram. The graphical representation is a visualization that can provide insight into the distribution of light or other relevant features capture in the imagery. FIG. 5 illustrates an example histogram 502 generated from an image 504. The image 504 is a line drawing for purposes of this patent application to represent an actual image (e.g., photograph) that would be used to generate the histogram 502. In one example, the histogram can be generated from an image using any known algorithm to generate a histogram, such as second and third color histogram, packages (matplotlib) in Python that can be used to generate histograms, matlab, and so forth.

In one example, the computing system filters out areas of interest that are below a predefined threshold of light and only considers those areas of interest that have above the predefined threshold of light for a safety score for one or more of a pickup location, a drop-off location or a road segment. This reduces the computational resources needed and increases the speed of generating safety scores for areas of interest since the computing system only has to consider a subset of possible areas of interest.

In one example, a machine learning model is used to analyze imagery and exclude areas of interest that do not have light or have very low light. For example, a machine learning model can be trained to determine RGB values for each area of interest and only indicate areas of interest that have above a predefined threshold of light as areas of interest to consider for a safety score for one or more of a pickup location, a drop-off location, or a road segment. Some examples of a machine learning model include convoluted neural network model, Keras model, scaled invariant feature transform (SIFT), principal component analysis (PCA) data, and the like.

In operation 310, the computing system generates a safety score for each individual area of interest based on the lighting metric for each pixel in each individual area of interest (or a subset of the areas of interest after filtering out with a machine learning model as described above). For example, the computing system adds together all lighting metrics for each pixel in the area of interest to generate an overall safety score indicating the amount of light in the area of interest. A higher overall safety score indicates more light in the area of interest.

In one example, the computing system additionally uses accident data for each individual area of interest to generate the safety score. For example, the computing system can access data, such as government or police databases, crowd sourcing data, or other data sources that have accident data, crime data or other incident data for particular geolocations. In this example, the computing system integrates relevant parameters (e.g., number of accidents a month, number of crimes a month), emphasizing elements such as time and location. This integration can help generate a more comprehensive spatiotemporal data to understand when and where accidents and incidents are more likely to occur. This data can be appended to the central data repository 224. In this example, to generate the safety score the computing system adds together all lighting metrics for each pixel in the area of interest to generate an overall lighting score indicating the amount of light in the area of interest and then adds up all of the accident and incident metrics to generate an overall accident and incident score. These scores are then combined to generate an overall safety score for the area of interest.

In one example, the scores are weighted before being combined into the overall safety score. In one example, the lighting score is weighted more than the accident and incident score. For example, the lighting score can be weighted 0.7 and the accident an incident score can be weighted 0.3 and then used to generate the overall safety score for the area of interest. It is to be understood that over weight values can be used in examples described herein.

In operation 312, the computing system stores the safety score for each individual area of interest in one or more datastores, such as database(s) 126. The safety scores for an area of interest can be provided to another computing system or a computing device.

Figure 6:
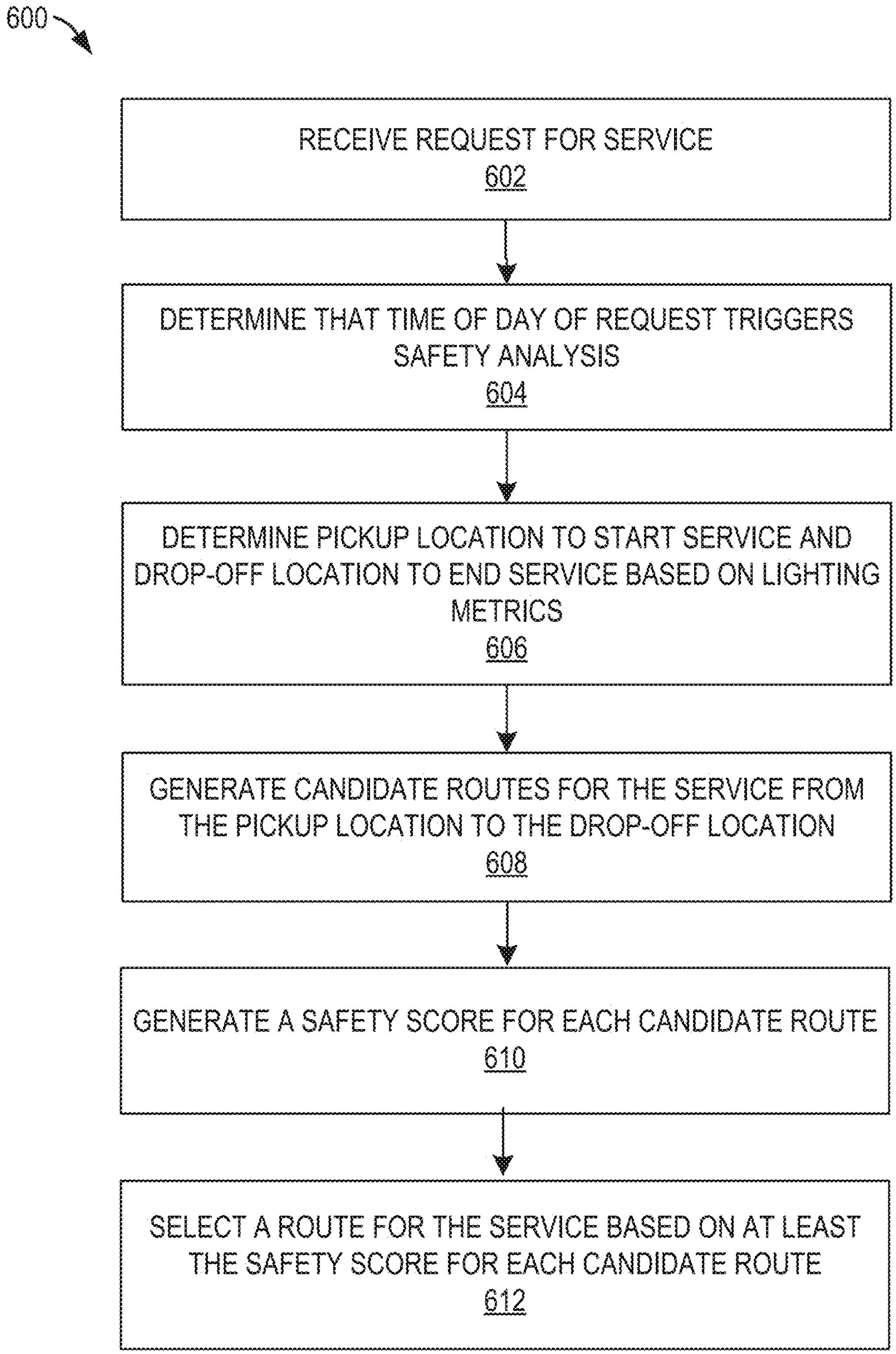
FIG. 6 is a flowchart illustrating aspects of a method, according to some examples.

FIG. 6 is a flowchart illustrating aspects of a method 600 for generating, in real time or near real time (e.g., within seconds or milliseconds) in response to a request for service, a pickup location, a drop-off location and/or generating and selecting a route, based on a safety score for an area of interest, according to some examples. For illustrative purposes, the method 600 is described with respect to the networked system 100 of FIG. 1. It is to be understood that the method 600 may be practiced with other system configurations in other embodiments.

In operation 602, a computing system (e.g., server system 102 or the safety routing identification system 124), receives a request for service indicating a start location and a destination location for the service. For example, a user can request a service, such as a ride sharing service or a delivery service, via an application on the user's computing device. The computing device sends the request for service to the computing system. The request can include an indication of a start location and a destination location, such as a current location of the user, a location input by a user, a location for drop-off or delivery, and the like. The computing system receives the request and determines the indicated start location and destination location for the service.

In operation 604, the computing system determines that a time of day indicated by the request triggers a safety analysis. For example, the computing system can determine a timestamp associated with when the request was sent or received and determine that it is a time withing a predefined time window that triggers a safety analysis. For example, the predefined time window can be between sunset and sunrise or the hours of darkness for a geographical location corresponding to the start location and/or the destination location.

Based on determining that the time of day triggers a safety analysis, in operation 606, the computing system analyzes the start location and destination location to identify a pickup location to start the service and a drop-off location to end the service based on lighting metrics associated with the pickup location and the drop-off location. For example, the computing system accesses one or more predefined pickup locations (e.g., areas of interest) associated in the start location as candidate pickup locations. The computing system determines a safety score based on the lighting metrics for each candidate pickup location. The safety score is computed in real-time/near real time (e.g., withing seconds or milliseconds) as explained above or is previously computed and accessed from a data store (such as central database repository) for each candidate pickup location. The safety score can be further generated based on an accident and incent score, as also explained above, and computed in real-time or accessed from the data store. The computing system selects the pickup location to start the service from the candidate pickup locations based on the safety score of each candidate pickup location. For instance, the computing system can select a pickup location with a highest safety score.

Likewise, the computing system accesses one or more predefined drop-off locations (e.g., areas of interest) associated with the destination location as candidate drop-off locations. The computing system determines a safety score based on the lighting metrics for each candidate drop-off location. The safety score is computed in real-time/near real time as explained above or is previously computed and accessed from a data store (such as central database repository) for each candidate drop-off location. The safety score can be further generated based on an accident and incent score, as also explained above, and computed in real-time or accessed from the data store. The computing system selects the drop-off location to start the service from the candidate drop-off locations based on the safety score of each candidate drop-off location. For instance, the computing system can select a drop-off location with a highest safety score.

The computing system generates a plurality of candidate routes for the service from the pickup location to the drop-off location, in operation 608. For example, the computing system can use existing or future methods, such as distance-vector algorithms, link-state algorithms or path-vector algorithms, to generate various routes from the pickup location to the drop-off location via map and navigation data.

In operation 610, the computing system generates a safety score for each candidate route of the plurality of candidate routes by identifying lighting metrics based on pixel values in imagery for each segment of each candidate route, as explained above. For example, the computing system determines pre-computed safety scores for each road segment (e.g., area of interest) stored in a data store, such as central database repository 224 or generates the safety score for each road segment real-time, as also explained above. The safety score can be further generated based on an accident and incent score, as also explained above, and computed in real-time/near real time or accessed from the data store. The computing system adds up all the safety scores for each segment of the route to generate an overall safety score for the route.

In operation 612, the computing system selects a route for the service based on a least the safety score of each candidate route. For example, the route can be a route with a highest safety score, or the safety score can be one of several parameters used to select the route, such as an estimated time of arrival, an availability of a vehicle, and so forth. The computing device can provide the selected route to the computing device to be used by a vehicle for navigation from the pickup location to the drop-off location.

Figure 7:
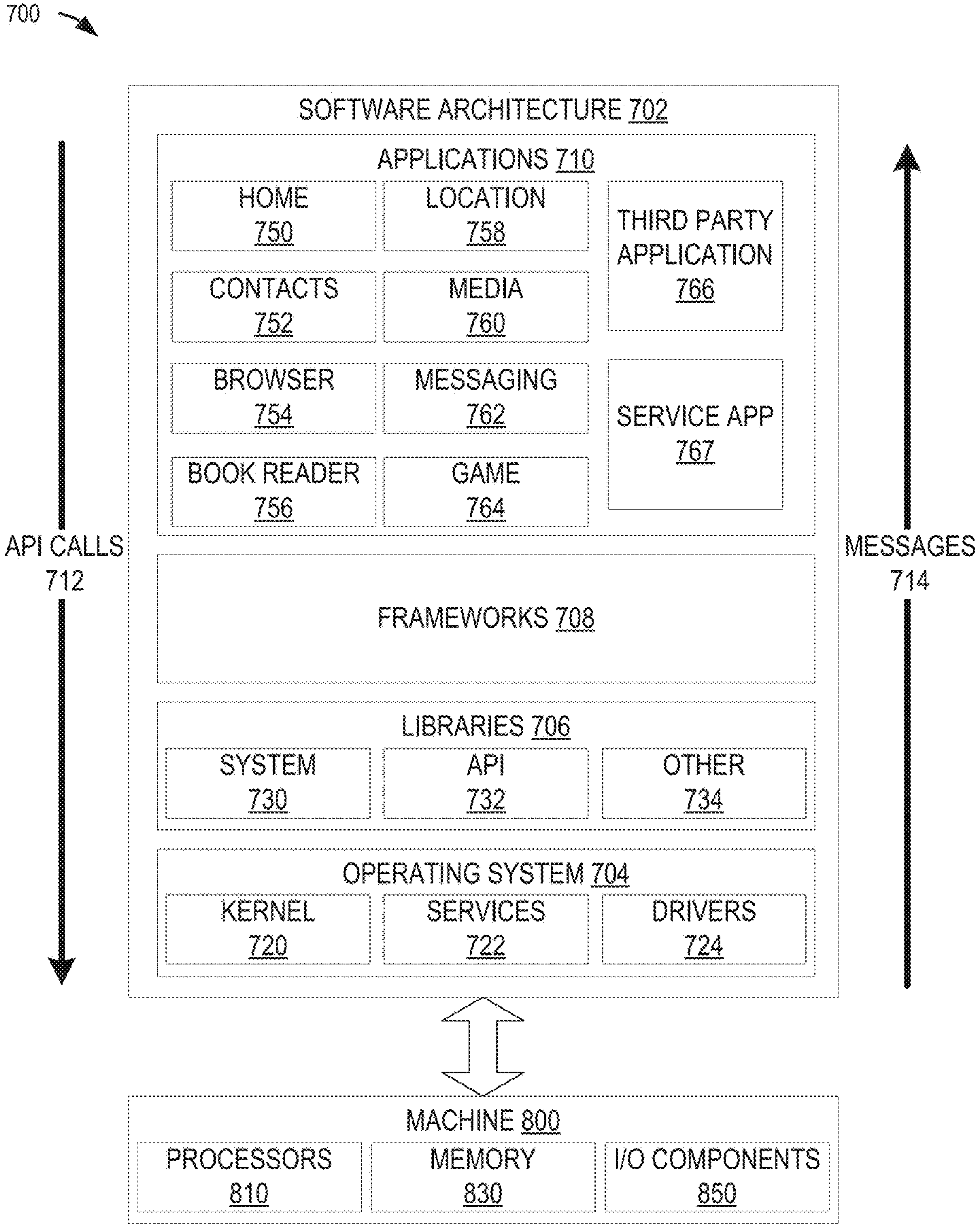
FIG. 7 is a block diagram illustrating an example of a software architecture that may be installed on a machine, according to some examples.

FIG. 7 is a block diagram 700 illustrating a software architecture 702, which can be installed on any one or more of the devices described above. For example, in various embodiments, client devices 110 and servers and systems 130, 102, 120, 122, and 124 may be implemented using some or all of the elements of the software architecture 702. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematical functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Some embodiments may particularly include a service application 767, such as a ride sharing application. In certain embodiments, this may be a standalone application that operates to manage communications with a server system such as third-party servers 130 or server system 102. In other embodiments, this functionality may be integrated with another application (e.g., a mapping or navigation application). The ride sharing application 767 may request and display various data related to pickup and drop-off locations, POIs, mapping and navigation, and so forth, and may provide the capability for a user 106 to input data related to the objects via a touch interface, via a keyboard, or using a camera device of the machine 800; communicate with a server system via the I/O components 850; and receive and store object data in the memory 830. Presentation of information and user inputs associated with the information may be managed by the ride sharing application 767 using different frameworks 708, library 706 elements, or operating system 704 elements operating on the machine 800.

Figure 8:
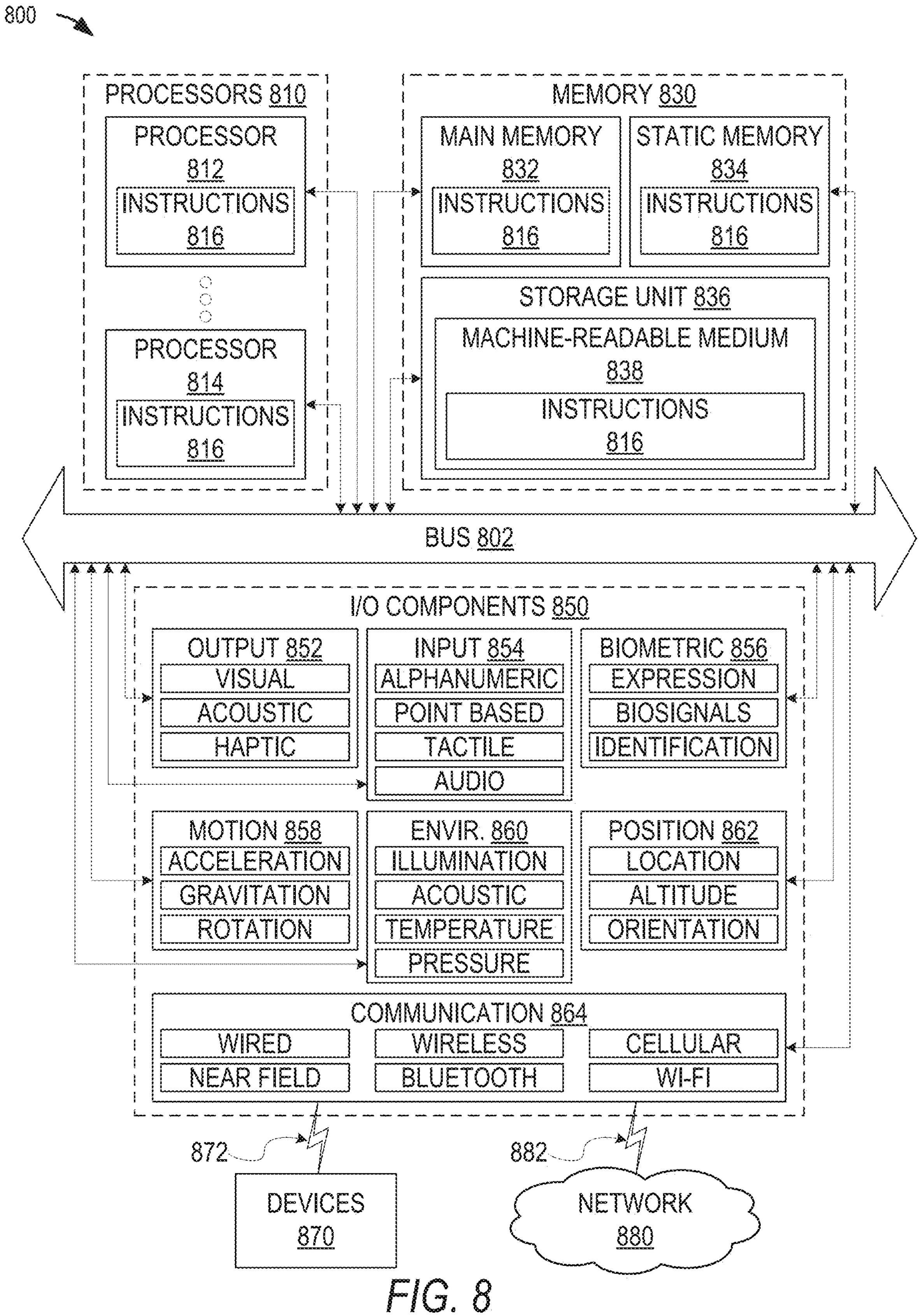
FIG. 8 illustrates a diagrammatic representation of a machine, in the form of a computer system, within which a set of instructions may be executed for causing the machine to perform any one or more of the methodologies discussed herein, according to some examples.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or system 130, 102, 120, 122, 124, etc., or a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions, when executed by one or more processors of the machine (e.g., the processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D barcodes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:

generating temporal geospatial vector data based on data for at least one of residential areas, road networks, public places, pickup and drop-off locations and topological lavers;

buffering the temporal geospatial vector data to generate areas of interest;

extracting imagery associated with each of the areas of interest;

generating a lighting metric for each pixel for each area of interest based on analyzing the extracted imagery to determine lighting in each area of interest;

generating a safety score for each area of interest based on the lighting metric for each pixel in each individual area of interest;

storing the safety score for each area of interest in one or more datastores;

identifying a pickup location to start a requested service based on a safety score for an area of interest associated with a start location for the requested service; and identifying a drop-off location to end the requested service based on a safety score for an area of interest associated with a destination location for the requested service.

2. The computer-implemented method of claim 1, wherein the imagery is satellite imagery.

3. The computer-implemented method of claim 1, wherein the imagery is based on camera imagery from each of a plurality of cameras in a respective vehicle.

4. The computer-implemented method of claim 1, wherein generating the safety score for each area of interest is further based on accident data for each area of interest.

5. The computer-implemented method of claim 4, wherein the lighting is weighted more than the accident data to generate the safety score.

6. The computer-implemented method of claim 1, wherein a subset of the areas of interest are individual road segments.

7. The computer-implemented method of claim 1, wherein a subset of the areas of interest are the pickup and drop-off locations.

8. The computer-implemented method of claim 1, wherein the areas of interest include the residential areas or the public places.

9. The computer-implemented method of claim 1, wherein analyzing the extracted imagery to determine lighting in each area of interest comprises determining an RGB value for each pixel for each area of interest.

10. The computer-implemented method of claim 1, further comprising:

generating a plurality of candidate routes for the requested service from the pickup location to start the requested service to the drop-off location to end the requested service;

generating a safety score for each candidate route of the plurality of candidate routes by identifying lighting metrics based on pixel values in imagery for each segment of each candidate route;

selecting a route for the requested service based on a least the safety score of each candidate route; and providing the selected route to a computing device.

11. The computer-implemented method of claim 10, wherein generating the safety score is triggered based on a time of day indicated by the requested service.

12. A computing system comprising:

a memory that stores instructions; and one or more processors configured by the instructions to perform operations comprising:

generating temporal geospatial vector data based on data for at least one of residential areas, road networks, public places, pickup and drop-off locations and topological layers;

buffering the temporal geospatial vector data to generate areas of interest;

extracting imagery associated with each of the areas of interest;

generating a lighting metric for each pixel for each area of interest based on analyzing the extracted imagery to determine lighting in each area of interest;

generating a safety score for each area of interest based on the lighting metric for each pixel in each individual area of interest;

storing the safety score for each area of interest in one or more datastores;

identifying a pickup location to start a requested service based on a safety score for an area of interest associated with a start location for the requested service; and identifying a drop-off location to end the requested service based on a safety score for an area of interest associated with a destination location for the requested service.

13. The computing system of claim 12, wherein the imagery is satellite imagery.

14. The computing system of claim 12, wherein the imagery is based on camera imagery from each of a plurality of cameras in a respective vehicle.

15. The computing system of claim 12, wherein generating the safety score for each area of interest is further based on accident data for each area of interest.

16. The computing system of claim 15, wherein the lighting is weighted more than the accident data to generate the safety score.

17. The computing system of claim 12, wherein a subset of the areas of interest are individual road segments and wherein a subset of the areas of interest are the pickup and drop-off locations.

18. The computing system of claim 12, wherein the areas of interest include the residential areas or the public places.

19. The computing system of claim 12, wherein analyzing the extracted imagery to determine lighting in each area of interest comprises determining an RGB value for each pixel for each area of interest.

20. A non-transitory computer-readable medium comprising instructions stored thereon that are executable by at least one processor to cause a computing system to perform operations comprising:

generating temporal geospatial vector data based on data for at least one of residential areas, road networks, public places, pickup and drop-off locations and topological layers;

buffering the temporal geospatial vector data to generate areas of interest;

extracting imagery associated with each of the areas of interest;

generating a lighting metric for each pixel for each area of interest based on analyzing the extracted imagery to determine lighting in each area of interest;

generating a safety score for each area of interest based on the lighting metric for each pixel in each individual area of interest;

storing the safety score for each area of interest in one or more datastores:

identifying a pickup location to start a requested service based on a safety score for an area of interest associated with a start location for the requested service; and identifying a drop-off location to end the requested service based on a safety score for an area of interest associated with a destination location for the requested service.

* * * * *